United States Patent [19]

Iwasaki et al.

[11] Patent Number: 4,848,678
[45] Date of Patent: Jul. 18, 1989

[54] APPARATUS FOR CRUSHING FRUIT AND VEGETABLES

[75] Inventors: Atsushi Iwasaki, Hino; Hideaki Ohta, Hiratsuka; Katsumi Oda, Yokohama; Naoshi Tsukada, Noda; Kiyoshi Sekine, Saitama, all of Japan

[73] Assignees: Kikkoman Corporation, Noda; Unicoopjapan, Tokyo, both of Japan

[21] Appl. No.: 163,552

[22] Filed: Mar. 3, 1988

[30] Foreign Application Priority Data

Mar. 17, 1987 [JP] Japan .................................. 62-60012
Aug. 10, 1987 [JP] Japan ................................. 62-199305

[51] Int. Cl.⁴ .......................................... B02C 23/18
[52] U.S. Cl. .................. 241/65; 241/101 B; 241/186 A; 241/188 A; 241/DIG. 14
[58] Field of Search ....................... 426/511, 518, 519; 241/DIG. 14, 65, 23, 101 B, 66, 57, 186 A, 188 A, 186 R

[56] References Cited

U.S. PATENT DOCUMENTS

| 2,561,043 | 7/1951 | Ayers ................................. 241/65 X |
| 2,873,663 | 2/1959 | Hawk et al. ...................... 241/65 X |
| 4,463,022 | 7/1984 | Sterner et al. ................... 241/65 X |

FOREIGN PATENT DOCUMENTS

| 6406055 | 12/1964 | Netherlands .......................... 241/65 |
| 995856 | 2/1983 | U.S.S.R. .............................. 241/65 |

Primary Examiner—Mark Rosenbaum
Attorney, Agent, or Firm—Banner, Birch, McKie & Beckett

[57] ABSTRACT

A method of and an apparatus for crushing raw materials such as fruit and vegetables while heating the raw materials by using a heating medium such as steam or an inactive heating gas in an enclosed device from which the outside air is excluded.

5 Claims, 1 Drawing Sheet

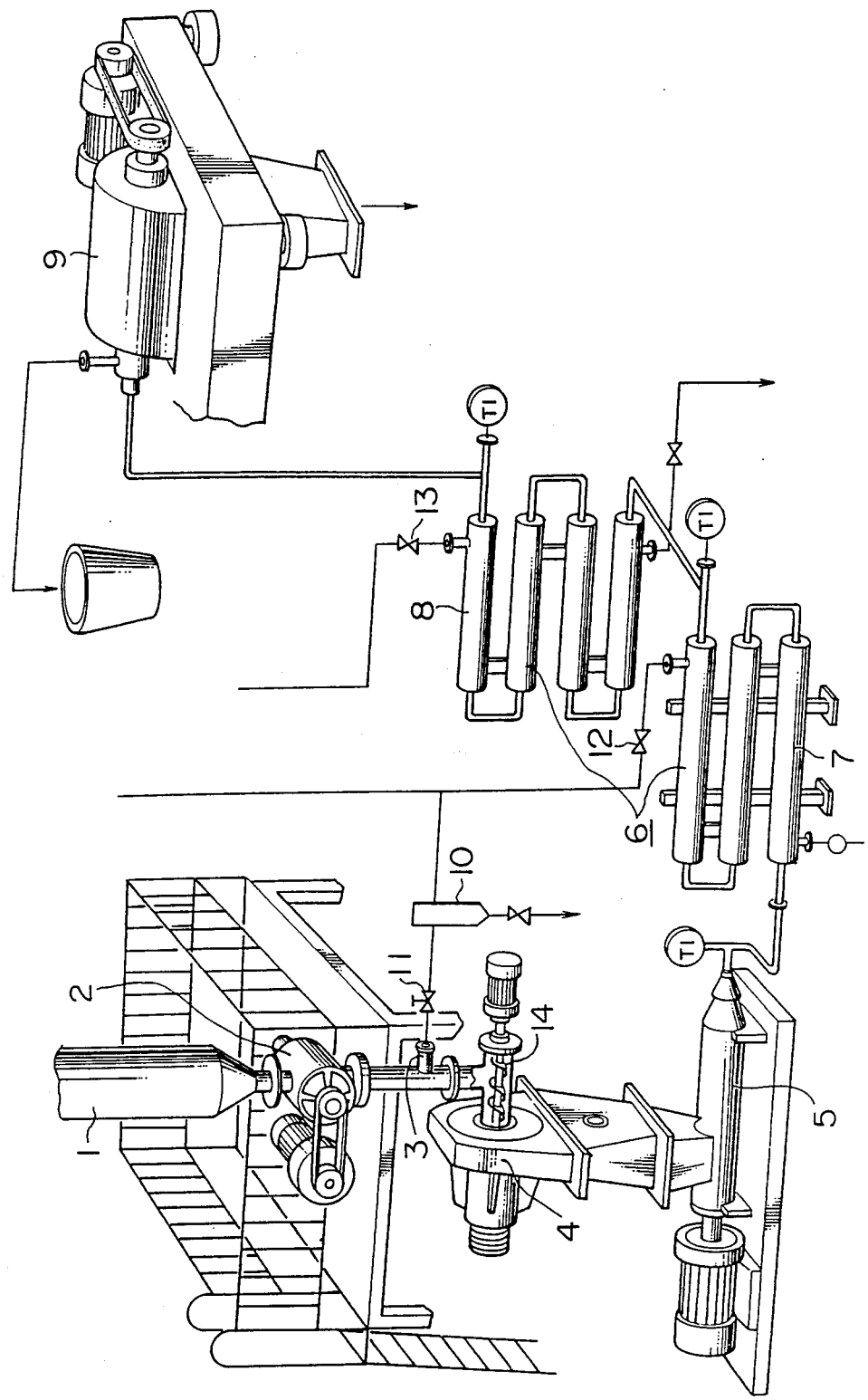

APPARATUS FOR CRUSHING FRUIT AND VEGETABLES

BACKGROUND OF THE INVENTION

1. Field of the Invention

The present invention relates generally to a method of crushing fruit and vegetables and an enclosed crushing apparatus for carrying out the same, and in particular to a process for producing juice and paste from the fruit and vegetables.

2. Description of the Related Art

In a typical process for producing juice or paste from fruit or vegetables, particularly fruit juice from apples or other fruit, an antioxidant such as L-ascorbic acid (vitamin C) is in general used as an additive in order to prevent discoloration from being caused by oxidation due to an enzyme, such as polyphenol oxidase, which is typically contained in apples.

In another conventional process for producing vegetable juice from carrots, after carrots have been peeled and cut into pieces, blanching is commonly effected in order to prevent discoloration of the pieces from being caused by oxidation due to the action of enzymes contained in the carrots. The blanched pieces, in turn, are subjected to crushing and extraction.

However, the former method involves various problems; for example, L-ascorbic acid is expensive, and the natural flavors of fruit are damaged by the chemical reduction action of L-ascorbic acid. Also, the latter method involves the following problems. Since, during blanching, effective components such as sugar and natural flavors contained in carrots escape into the boiling liquid, the quality of the obtained vegetable juice is degraded. Further, since carrots are subjected to the three steps of cutting, blanching, and crushing, a remarkable increase in the scale of equipment and the operating cost thereof cannot be avoided.

SUMMARY OF THE INVENTION

It is therefore an object of the present invention to provide a method of crushing fruit and vegetables which is capable of preventing discoloration from being caused by oxidation due to the action of enzymes contained in the fruit and vegetables, and hence variations in the natural flavors thereof, by crushing the fruit and vegetables while heating them in an enclosed apparatus.

It is another object of the present invention to provide a method of crushing fruit and vegetables which enables simplification of the entire process and apparatus as well as reductions in the operating cost.

It is another object of the present invention to provide an enclosed crushing apparatus for crushing fruit and vegetables which is capable of preventing discoloration from being caused by oxidation due to the action of enzymes contained in the fruit and vegetables, and hence variations in the natural flavors thereof.

It is another object of the present invention to provide an enclosed crushing apparatus for crushing fruit and vegetables which enables simplification of the entire process and the apparatus as well as reductions in the operating cost.

More specifically, a primary feature of the method of crushing fruit and vegetables in accordance with the present invention resides in the step of crushing the fruit and vegetables while heating them by using a heating medium such as steam or an inactive heating gas in an enclosed apparatus from which the outside air is excluded.

Accordingly, in the operation of the present invention, a heating medium such as steam is used in the enclosed apparatus from which the outside air is excluded to eliminate the action of enzymes, thereby preventing discoloration from being caused by oxidation due to the crushing of fruit or vegetables, and hence variations in the natural flavors thereof.

It will be readily understood from the foregoing that, in accordance with the present invention, a heating medium such as steam or an inactive heating gas is supplied to an enclosed crushing device to exclude the outside air and at the same time to heat the fruit or vegetables to be crushed, thereby inactivating enzymes and eliminating the problem of discoloration due to oxidation. Accordingly, it is possible to retain the color tone and natural flavors of the fruit or vegetables in a stable state.

Also, the enclosed crushing apparatus in accordance with the present invention comprises a first-stage (upstream) valve for feeding fruit or vegetables while keeping them away from the outside air; a crushing device for crushing fruit or vegetables supplied through the first-stage valve; a device for supplying a heating medium such as steam to the crushing device; and a second-stage (downstream) valve for feeding crushed fruit or vegetables in an airtightly enclosed state.

Accordingly, in the arrangement and structure of the present invention, the enclosed crushing device is airtightly sealed by the first-stage and second-stage valves for feeding fruit or vegetables, and the heating medium such as steam is supplied to the interior of the enclosed crushing device, thereby excluding the outside air and heating the fruit or vegetables to inactivate the enzymes contained therein. In consequence, discoloration due to oxidation is eliminated and a stable color tone can be achieved, as well as allowing the natural flavors to be retained.

It will be readily understood from the foregoing that, in the arrangement and structure of the present invention, valves are disposed at the first and second stages of the crushing device so as to airtightly enclose the same, the heating medium such as steam being supplied to the thus-sealed crushing device. Thus, the fruit or vegetables to be crushed are kept away from the outside air and heated. In consequence, the enzymes contained in the fruit or vegetables are inactivated and the problem of discoloration due to oxidation is solved, the stability of the color tone and natural flavors of the fruit or vegetables also being ensured. Furthermore, not only is the cost of production of juice reduced but also the quality thereof can be stabilized.

BRIEF DESCRIPTION OF THE DRAWINGS

The single drawing attached hereto is a diagrammatic perspective view, with portions broken away and omitted for convenience, of one preferred embodiment for carrying out a crushing method of the present invention.

DESCRIPTION OF THE PREFERRED EMBODIMENT

A preferred embodiment of the present invention will be described below with reference to the accompanying drawing.

The present invention is designed to treat fruit such as apples and peaches, root vegetables such as carrots and sweet potatoes, fruit vegetables such as pumpkins and tomatoes, and leafy vegetables such as cabbages and Chinese cabbages.

These fruit or vegetables are cut into pieces of a suitable size, and the thus-obtained pieces are put into an enclosed crushing device, in which they are crushed. The interior of the enclosed crushing device is charged with a heating medium such as steam to exclude air to a substantial degree. In this state, the fruit or vegetables are heated and crushed.

Apples or the like are heated under the temperature condition of 60° to 115° C., preferably 75° to 95° C. In the case of carrots, sweet potatoes, pumpkins, tomatoes, cabbages, Chinese cabbages or the like, the temperature condition for them is 70° to 120° C., preferably 85° to 100° C.

The following is a description of a method of treating such fruit and vegetables by means of the enclosed crushing apparatus illustrated in the single attached drawing.

A chute 1 is disposed to allow a raw material to be passed therethrough, and an enclosed rotary valve 2 serving as an first-stage valve is located immediately below the chute 1. A steam nozzle 3 is located downstream of the enclosed rotary valve 2, and steam is fed through the steam nozzle 3 to exclude the outside air and at the same time to heat the same. The thus-treated raw materials are continuously fed to a crushing device 4. Of course, a suitable enclosed container may be used to effect crushing by a batch method.

Although not shown in detail, the crushing device 4 has an airtightly sealed structure, and the portions of the crushing device 4 through which its rotary shaft extends are provided with special sealing mechanisms. The interior of the crushing device 4 is charged with steam supplied through the steam nozzle 3. Therefore, the raw materials such as fruit or vegetables are thus heated as they are being crushed.

A feed pump 5 serving as a second-stage valve is constituted by a sanitary type mono-pump having an airtightly sealed structure with a special sealing mechanism. Also, the feed pump 5 is suitable for the feeding of a solid-liquid mixture, though there is no risk of the raw material adhering to the inner wall of the feed pump 5. Crushed fruit or vegetables are fed by the feed pump 5 to a heat exchanger 6.

The heat exchanger 6 which is a double-pipe heat exchanger for viscous liquid is comprised of a heating portion 7 and a quenching portion 8. The heating portion 7 is arranged to maintain the temperature of the crushed material at a fixed value, and the quenching portion 8 is arranged to cause a rapid temperature drop which is matched to the performance of an extraction device 9 which is located downstream of the quenching portion 8. The portions 7 and 8 cooperate with each other to optimize the temperature and duration of the heating of the raw materials.

The heating portion 7 has a static mixer (not shown) in its interior. The static mixer can be easily cleaned since adhesion or sticking of the raw materials therein does not readily occur because of its simple structure, through it retains a good heat transmission capability. The heating portion 7 may be constituted by pipes having heat insulators which function to maintain the temperature of products. The heat exchanger 6 need not necessarily be incorporated, and instead, for example, the feed pump 5 may be connected directly to the extraction device 9.

The following is a detailed description of an example in which the above-described embodiment is applied to the treatment of apples.

Washed apples are supplied as raw materials through the chute 1, and are forcibly fed to the crushing device 4 through the enclosed rotary valve 2.

The steam nozzle 3 is provided at a position below the rotary valve 2 so that steam is supplied through an iron eliminating filter 10 in order to heat the raw apples and simultaneously exclude the outside air. An automatic temperature adjustment valve 11 is disposed in the vicinity of a steam inlet so as to maintain the temperature of the apples at a predetermined value.

A screw feeder 14 for smoothly supplying the heated apples is provided on the inlet side of the crushing device 4.

Although not shown in detail, the crushing device 4 is a rotary pin disk type crushing device (sanitary 2S type crushing device made by Kikkoman Co., Ltd.). The crushing device 4 is designed to enable prevention of the adhesion of raw materials, prevention of the leakage of raw materials by means of a special sealing mechanism, and provision of heat resistance. Accordingly, the crushing device 4 exhibits an excellent capability in crushing and heating the apples so that they may be matched to the extraction effected in the ensuing step.

The apples crushed by the crushing device 4 are compressed and fed by the sanitary type mono-pump 5 (a model NEL-S made by Heishin Sohbi Kabushiki Kaisha). The apples, in turn, are held in the heating portion 7 at a predetermined temperature for a predetermined period of time. Subsequently, the apples are quenched in the quenching portion 8, and are fed to the extraction device 9 in the succeeding step.

The temperature of the apples which is maintained in the heating portion 7 of the heat exchanger 6 is adjusted by a steam adjustment valve 12, the time during which the apples are retained in this portion 7 being adjustable by changing the number of heating pipes.

The cooling temperature of the quenching portion 8 of the heat exchanger 6 is adjusted by a water adjustment valve 13, and the cooling time is adjustable by changing the number of cooling pipes.

If crushability varies owing to changes in such factors as the kind of apples or their maturity, an optimum condition can be selected by changing the rotational speed of the crushing device.

The following is a description of several examples to which the above-described apparatus is concretely applied in accordance with the kind of fruit and vegetables to be treated. It is, however, to be understood that the invention is not limited in the following examples.

EXAMPLE 1

Peeled carrots (T-1) and non-peeled carrots (T-2) were respectively fed at the rate of 200 kg per hour, crushed at a heating temperature of 95° C., and retained in the heating pipe 7 at 95° C. for thirty minutes Thus, carrot juice from each lot of carrots (T-1) and (T-2) was prepared.

For the purpose of comparison, some other peeled carrots were blanched in 100° C. boiled water for three minutes, crushed by a hammer mill, and ground by a feather mill. Thus, another lot of carrot juice was prepared as a comparative example.

These samples of carrot juice were subjected to extraction by a decanter type extraction device, and the respective lots of extracted liquids were analyzed. The result is shown in Table 1.

TABLE 1

|  | T-1 | T-2 | Comparative Example |
|---|---|---|---|
| Soluble Sugar (°BX) | 7.0 | 7.0 | 6.4 |
| Acidity (%) | 0.052 | 0.048 | 0.094 |
| Color Tone |  |  |  |
| L | 36.97 | 37.47 | 31.06 |
| a | 16.57 | 17.53 | 9.91 |
| b | 21.11 | 21.38 | 15.07 | where soluble sugar (°BX): refractive indices at 20° C. measured by a 3 type refractometer produced by ATAGO,
acidity (%): amount of alkali required for neutralizing each sample with 0.1 N NAOH (calculated in terms of citric acid), and
color tone: L (lightness), a (redness), and b (yellowness) of 5 ml of extracted liquid which were calculated from reflected light thereof by TPC-8D produced by Tokyo Denshoku.

Also, sensory tests on the respective lots of extracted juice were undertaken by a panel of 16 members (8 men and 8 women) on the basis of a five-step evaluation (from −2 to +2). Table 2 shows the results.

TABLE 2

|  | T-1 | T-2 | Comparative Example |
|---|---|---|---|
| Color Tone Appearance | 0.44 | 0.50 | −1.5 |
| Smell | 0.06 | −0.38 | −0.69 |
| Taste | −0.19 | −0.25 | −1.69 |
| Evaluation | −0.25 | −0.31 | −1.44 |

As can be seen from the results shown in Table 1 and 2, the carrot juice produced by the present inventive method is rich in soluble sugar as compared with the comparative examples (this result indicates that the loss of raw material in crushing is small), and an excellent color tone can be achieved. In the sensory test, good flavor and color tone were also found.

EXAMPLE 2

Apples cut into eight pieces each were fed at a rate of 250 kg per hour, crushed at a heating temperature of 80° C., quenched to 40° C. or less, and subjected to extraction. In consequence, oxidase was completely inactivated, and the obtained apple juice showed hardly any browning.

EXAMPLE 3

Peeled sweet potatoes and peeled pumpkins were crushed, and treated in the heating portion 7 at a heating temperature of 90° C. for a retention time of 45 seconds. The resultant sweet potato paste and pumpkin paste were superior in flavor and color tone to conventional products.

What is claimed is:

1. An enclosed apparatus for crushing raw materials such as fruit and vegetables, comprising:
   first-stage enclosed rotary valve means for feeding said raw materials;
   a rotary pin disc crushing device for crushing said raw materials supplied through said first-stage rotary valve means;
   means for supplying a heating medium such as steam to exclude air from said crushing device and to heat said raw materials in the crushing device to a temperature of 75° C. to 100° C. to inactivate enzymes while retaining natural flavors; and
   second-stage valve means for discharging said raw materials which were crushed by said crushing device.

2. The apparatus according to claim 1, wherein said second-stage valve means is a mono-pump.

3. An enclosed apparatus for crushing raw materials such as fruit and vegetables, comprising:
   first-stage enclosed rotary valve means for feeding raw materials;
   a rotary pin disc crushing device for crushing said raw materials supplied through said first-stage rotary valve means;
   means for supplying a heating medium such as steam to exclude air from said crushing device and to heat said raw materials in the crushing device to a temperature of 75° C. to 100° C. to inactivate enzymes while retaining natural flavors;
   second-stage valve means for discharging said raw materials which were crushed by said crushing device; and
   a heat exchanger for heating and cooling said crushed materials.

4. The apparatus according to claim 3, wherein said heat exchanger includes a heating portion and a quenching portion.

5. The apparatus according to claim 4, wherein said heating portion has a static mixer in the interior.

* * * * *